United States Patent
Capossela et al.

[11] Patent Number: 5,897,642
[45] Date of Patent: Apr. 27, 1999

[54] METHOD AND SYSTEM FOR INTEGRATING AN OBJECT-BASED APPLICATION WITH A VERSION CONTROL SYSTEM

[75] Inventors: Chris C. Capossela, Seattle; Kenny M. Felder, Redmond; Nicholas J. Shulman, Bellevue; Peter H. Williamson, Kirkland, all of Wash.

[73] Assignee: Microsoft Corporation, Redmond, Wash.

[21] Appl. No.: 08/892,520

[22] Filed: Jul. 14, 1997

[51] Int. Cl.⁶ ........................................ G06F 17/30
[52] U.S. Cl. .................. 707/203; 707/1; 707/103
[58] Field of Search ..................... 707/1, 203, 103

[56] References Cited

U.S. PATENT DOCUMENTS

| | | | |
|---|---|---|---|
| 4,558,413 | 12/1985 | Schmidt et al. | 364/300 |
| 5,008,853 | 4/1991 | Bly et al. | 345/331 |
| 5,574,898 | 11/1996 | Leblang et al. | 707/1 |
| 5,617,528 | 4/1997 | Stechmann et al. | 395/326 |
| 5,617,533 | 4/1997 | Wu et al. | 395/183.14 |
| 5,717,879 | 2/1998 | Moran et al. | 395/339 |
| 5,727,203 | 3/1998 | Hapner et al. | 707/103 |
| 5,734,899 | 3/1998 | Yoshizawa et al. | 707/203 |
| 5,767,854 | 6/1998 | Anwar | 345/355 |
| 5,819,295 | 10/1998 | Nakagawa et al. | 707/203 |

OTHER PUBLICATIONS

House, Bill "How version control works", Data based advisor, v11, n7 p59(1) Jul. 1993.

Nicolaisen, Nancy "Version control for programming projects", Window Sources, v1, n4, p222(2) May 1993.

*Primary Examiner*—Paul R. Lintz
*Assistant Examiner*—Shahid Alam
*Attorney, Agent, or Firm*—Albert S. Michalik, Esq.

[57] ABSTRACT

A method and system for integrating an object-based application with a version control system. Selected objects of an application such as a database are converted to individual text files and written to a temporary folder. The individual text files are then exported from the temporary folder to a version control system, whereby the version control system manages the files for developers and other developers according to its capabilities. Developers can check in individual objects for revising, whereby the text file corresponding to the checked-in object is exported by the version control system to a temporary folder and the data therein converted back into data in the object. An application program interface is provided to facilitate communication between application programs and the version control program for importing and exporting the text files and exchanging other related information.

30 Claims, 7 Drawing Sheets

68

[checksum]
. . .
Object Type = Form
Cell = A1
Title = Sales Summary
X Dimension = 24
Y Dimension = 12
Cell Shading = 80
Field 1 width = 12
Field 1 Name = Supplier
. . .

FIG. 7

METHOD AND SYSTEM FOR INTEGRATING AN OBJECT-BASED APPLICATION WITH A VERSION CONTROL SYSTEM

FIELD OF THE INVENTION

The invention relates generally to tools used in the development of computer software, and more particularly to the management of application program files with a version control system.

BACKGROUND OF THE INVENTION

In many programming environments, it is typical that one or more teams of developers work on various portions of a program. For example, several developers may be responsible for developing a user interface in the C programming language, while others may be responsible for the other aspects of a program. As the individual developers revise their respective files, it is highly important to carefully track each of the files and versions thereof, e.g., if no control is kept, another developer will possibly overwrite, revise or interface with an old version of a file rather than the latest new version. As is apparent, without such control, a project can quickly become completely confused.

To help manage the control of file versions, computer-based version control systems such as Microsoft® Corporation's Visual SourceSafe have been developed. In general, version control systems manage groups of files, particularly text files. For example, among other features, the Visual Sourcesafe product tracks versions of files, allowing the developer to see which files are checked out, view a history of changes, visually compare differences, add files, check out the latest version of a file or revert and use an earlier version, even one which had been deleted. Visual SourceSafe lets developers check the file back in when changes, if any, are ready. In this manner, each member in a development team is aware of the status of the various component parts of a program, thereby coordinating a project, preventing confusion and allowing recovery if something goes wrong.

At the same time, application programs such as Microsoft® Corporation's Access database program output files consisting of many developer-created objects, including tables, queries, forms, reports, macros and modules. For a given database application, all of these objects are stored in a single binary file, (e.g., filename.mdb). In part, this is because some of the objects have complex interdependencies on one another, i.e., a change to one object impacts another.

As a result, although the various objects in a database application are often worked on by one or more teams of developers, the database application is not able to take advantage of the primary functionality of a version control system. More particularly, because the database objects are all stored in a combined (binary) file, the individual objects of a database cannot be individually tracked, checked in or checked out. As a result, the logistical problems that version control systems are designed to alleviate are present in database and other object-based applications, but such applications cannot leverage the features provided thereby.

OBJECTS AND SUMMARY OF THE INVENTION

Accordingly, it is a general objective of the present invention to provide a method and system for using a version control system with the individual objects of object-based applications.

A related objective is to provide a method and system of the above kind that functions without significant changes to existing version control systems and/or application programs.

Another objective is to provide the above method and system for version control of selected database objects.

In accomplishing those objectives, it is a related object to provide a method and system as characterized above that stores the object information in human-readable text files.

Briefly, the present invention provides a method and system for integrating a plurality of objects in an object-based application to a version control system. The system includes a storage for storing the objects and means for writing information representative of at least part of the data, such as data which has changed from default values, to a separate file for each selected object. An interface responsive to commands from the object-based application and the version control system transfers the files between the object-based application and the version control system, and allows other operations to take place on the files.

Other objects and advantages will become apparent from the following detailed description when taken in conjunction with the drawings, in which:

BRIEF DESCRIPTION OF THE DRAWINGS

FIG. 7 is a representation of object information written out as a text file for storing with a version control system.

DETAILED DESCRIPTION OF THE PREFERRED EMBODIMENT

Figure 1:
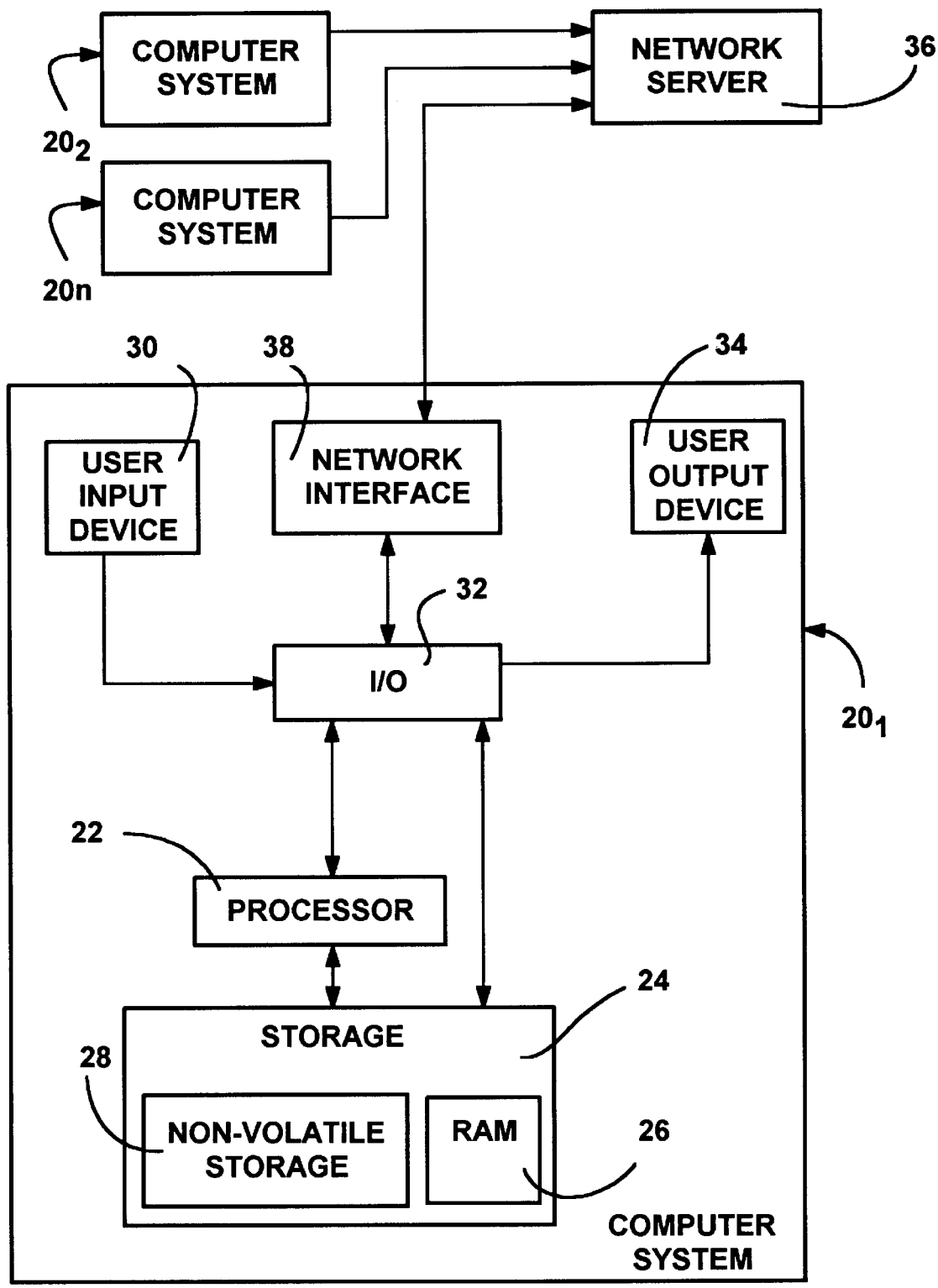
FIG. 1 is a block diagram representing a computer system in which the present invention may be incorporated.

Turning to the drawings and referring first to FIG. 1, there is shown a plurality of computer systems $20_1$–$20_n$, into each of which the present invention may be incorporated. Each of the computer systems such as the system $20_1$ includes a processor 22 operatively connected to storage 24, the storage including random access memory (RAM) 26 and non-volatile storage 28 such as a hard disk-drive, optical drive or the like. As can be appreciated, the non-volatile storage 28 can be used in conjunction with the RAM 26 to provide a relatively large amount of virtual memory via well-known swapping techniques.

The computer system $20_1$ also includes at least one input device 30, typically a keyboard and/or a user pointing device such as a mouse, connected through input-output circuitry (I/O) 32 for communicating user commands to the processor 22. Similarly, at least one local output device 34 such as a computer display monitor and speakers are connected to the I/O 32 for communicating information, such as via a graphical user interface, from the processor 22 to the user of the system $20_1$.

Although not necessary to the invention, the computer system 20$_l$ preferably communicates with a network server 36 and/or other computers or the like via appropriate network interface circuitry 38. To this end, the circuitry 38 comprises local-area-network adapter cards, serial ports or the like whereby information may be passed to and from the computer system 20$_l$. Such network connections are known and are not described in detail herein.

Figure 2:
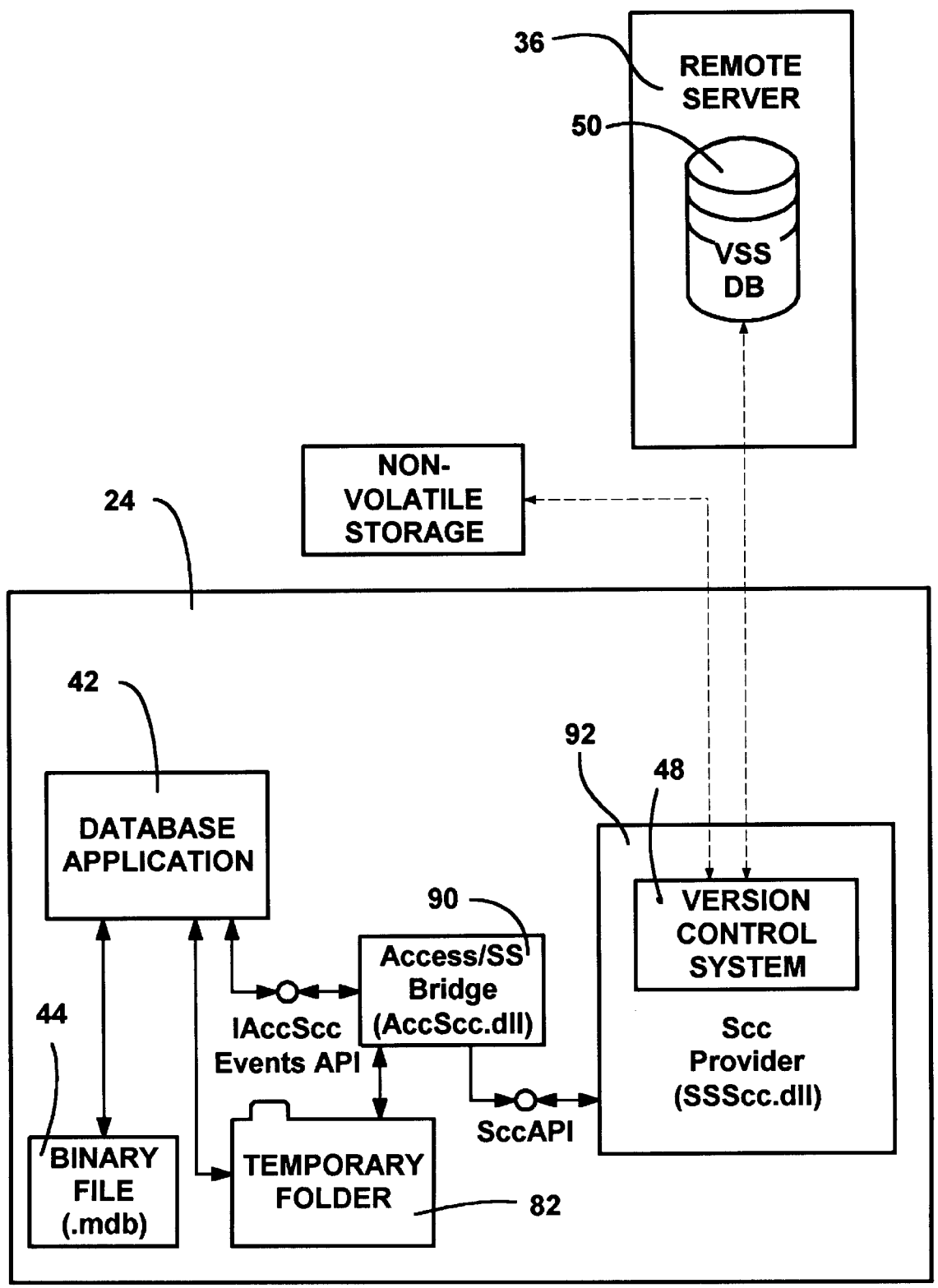
FIG. 2 is a block diagram representing various components in a preferred embodiment of the invention.

As shown in FIG. 2, the storage 24 has loaded therein an application program 42 such as Microsoft Access, a well-known database program. For simplicity, the application program 42 will be referred hereinafter to as a database application 42, although it is understood that the invention is not limited to database applications, but will work with other object-based applications including word processors, spreadsheets and the like wherein multiple elements (objects) are stored in a common file. The database application 42 allows the developer to create objects including queries, forms and reports in a database 43 (FIG. 3), and stores the database objects in a common binary file 44. For Microsoft Access, such a file has an "mdb" extension. Although not specifically shown in FIG. 2, as can be appreciated, the binary file 44 may be stored on the C:\drive 46 (FIG. 2) or elsewhere within the storage 24.

Also loaded in the storage 24 is a version control system 48 such as Microsoft Visual SourceSafe. As described in detail below with particular reference to FIG. 5, with the present invention the developer can access certain features of the version control system 48 through a user interface 52 of the database application 42. It should be noted that all or part of the version control system 48 may be alternatively executing on another computer, such as the remote network server 36, and communicate with the local system 20$_l$ in a known manner. In any event, the version control system 48 typically writes the files under its control to a storage 50 for such files, maintained on remote machine such as the network server 36, whereby multiple developers on separate local machines have access to the files. This storage 50 is shown in FIG. 2 as VSS (Visual SourceSafe) db. Although not necessary to the invention, the preferred version control system 48 is capable of handling multiple projects, with each project consisting of multiple files. When a project is created in the version control system 48, the creating program adds desired files to the version control system 48.

Figure 3:
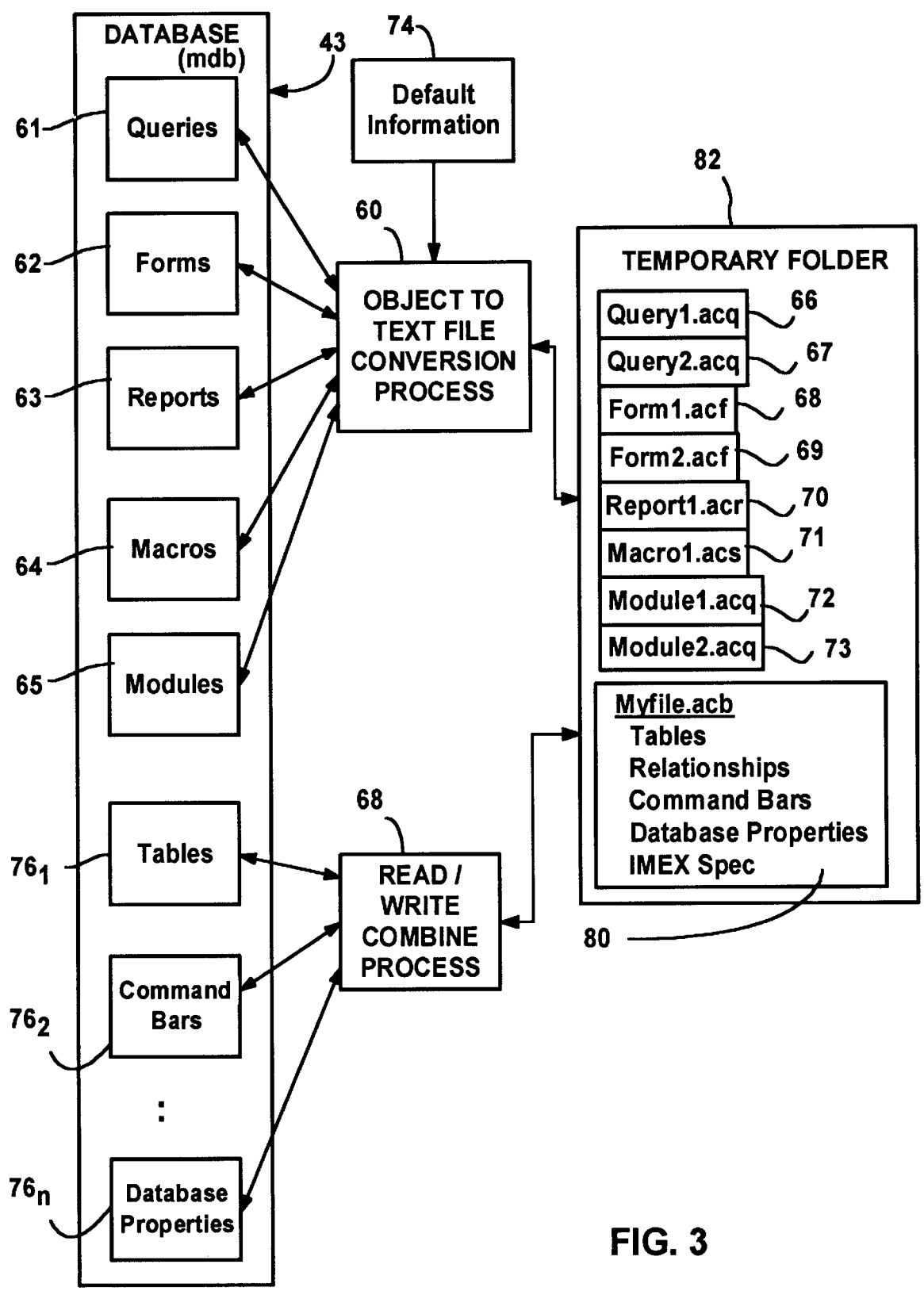
FIG. 3 is a block diagram of representative components for writing object information into a temporary folder for subsequent copying to a version control system.

In accordance with one aspect of the present invention, and as best shown in FIG. 3, the database application 42 is configured to write out selected ones of its objects (or parts of its objects) as text files. More particularly, queries, forms, reports, macros and modules are written as text files, while other objects including tables and relationships remain in a binary format. To this end, there is provided an object-to-text conversion process 60 or the like which takes the data in the query, form, report, macro and module objects 61–65, respectively, and writes the data from each as separate streams of text into separate text files 66–73. Thus, as shown in FIG. 3, in the present example, two queries are written into two text files, Query1.acq and Query2.acq, while two forms are written into text files Form1.acf and Form2.acf. Similarly, one report, one macro and two modules are written into text files Report1.acr, Macro1.acs, Module1.acm and Module2.acm, respectively.

It should be noted that there is no particular format required for writing out an object as text. In general, the only requirement is that the application program 42 write enough information, in a format that it understands, so that it can read in the text files at a later time and consistently recreate the objects therefrom. The responsibility for properly writing and recreating objects is thus placed on the application program 42, rather than the version control system 48, since the application 42 has the intimate knowledge of its own objects. Indeed, this model allows future application programs to take advantage of a version control system 48 even though the formats for arranging data in objects therein may not yet be defined. Lastly, note that the conversion process 60 need not be an internal part of the application program 42, but can be a separate process called (or object interfaced to) by the application program 42.

Because no particular format is required, other optimizations are feasible, e.g., the conversion process 60 for Microsoft Access does not include in the text file any object data that is unchanged from its default value, i.e., it writes only the deltas. For example, as shown in FIG. 7, an object may have data representing a cell (or range of cells) with a default background color equal to an indexed value of 50. The developer has changed the color of the cell to an indexed value of 78, and thus the changed background color is saved in the text file for this cell. At the same time another range of cells is not changed in background color and thus the color of those cells is not written to the text file. Accordingly, in this scheme the conversion process 60 has access to a set of default object values 74 for each type of object it converts.

As can be appreciated, the enhancement of saving only the deltas increases performance by reducing the amount of space required to store the text data, thereby reducing storage recall time and network transmission time. Moreover, changes to the default values with new versions of a program may result in automatic updates to existing forms and the like.

Further, the conversion process 60 includes code for reconstructing the object from the text data, i.e., from right to left in FIG. 3. Of course, the code that performs this complementary function may be provided in a separate process. In any event, in the preferred database application 42 (e.g., Microsoft Access) wherein only deltas are written, the set of object default information 74 is available so that the conversion process 60 (or separate process) can restore any missing values. Accordingly, the database application 42 organizes its text files 61–65 such that any omitted data (i.e., unchanged from its default value) is filled in with default values, without getting the data out of order. For example, a skip over a series of default values is recognized so that the next value (e.g., a color for a certain cell) will not be restored to an incorrect location (e.g., another cell). As can be appreciated, one way to accomplish correct restoration of such cell information is on a cell-by-cell and/or range-by-range basis, and so on.

Another optimization is to write the object (or object delta information) as text files so that they are human readable. Although not necessary to the invention, text files have a particular advantage in that a version control system 48 can compare and show a readable list of the changes from a previous version, which may be of significant value to a developer. Moreover, in certain circumstances text files allows multiple developers to simultaneously work on a file, and then later merge the respective changes. Of course, the invention will still work with objects separated into non-text files. Indeed, it is feasible to develop a system wherein both the version control system 48 and the database application 42 have previously agreed on a compressed storage format or the like, such that both can store the files in a compressed non-text format, and convert the data back to text as needed.

Providing human-readable files also potentially assists in error recovery, e.g., a review of the changes may point out an otherwise hard to find bug. However, because text files invite developer tinkering, a checksum is calculated and stored with the text file for forms and reports. Although not necessary to the invention, when the Access database program reads in a form or a report, the checksum is verified against the file. If the checksum is incorrect, (i.e., the file has been modified since it was saved), Access more closely examines the properties on the controls on the form, to ensure that none of them have invalid values. If any properties have invalid values (e.g., the left coordinate of a control being less than zero), Access informs the user as to which property is incorrect, and refuses to create a form from that text file. In general, the verification of property integrity upon detection of a checksum difference prevents the user from crashing the database program via a user's modification of a form or report text file. Other object types are much more difficult to modify in a manner that can crash the Access program, and at present, do not use checksum verification.

In keeping with one aspect of the invention, to facilitate the entire operation, there is also provided a file read/write process 68 for the objects which will remain in a binary form. In the database application 42, those objects which are not converted to text are those which have complex interdependencies on one another and thus are not practical or feasible to separate. For example, a table and a relationship may be interconnected in a manner that makes it necessary to work on them as a pair. Working on one separate from the other may place the database into an inconsistent state, with no reliable way to reconcile the inconsistencies. Moreover, it would be extremely difficult, if not impossible, to set rules which function in all scenarios without limiting development flexibility. Accordingly, tables, relationships, user-defined menus and toolbars (command bars), import/export specifications, database properties and startup properties, project references and project names for Visual Basic for Applications and conditional compilation arguments are all combined into a common binary file 80 such that all of these objects are checked in, edited and checked out together. As best represented in FIG. 3, these objects $76_1$–$76_n$ are stored in the common binary file 80, e.g., an exemplary file herein named myfile.acb.

Instead of directly copying the text files 66–73 and binary file 80 to and from the version control system 48, the files to are first written as temporary files to a temporary folder 82. From the temporary folder 82, the files are copied to the version control system 48, or, when operating in the other direction, read by the database application 42. The folder 82 may be invisible to the developer to further hinder tinkering. The names should be unique within each type, however if necessary, known techniques for avoiding naming collisions of the files within the temporary folder 82 may be practiced.

Figure 4:
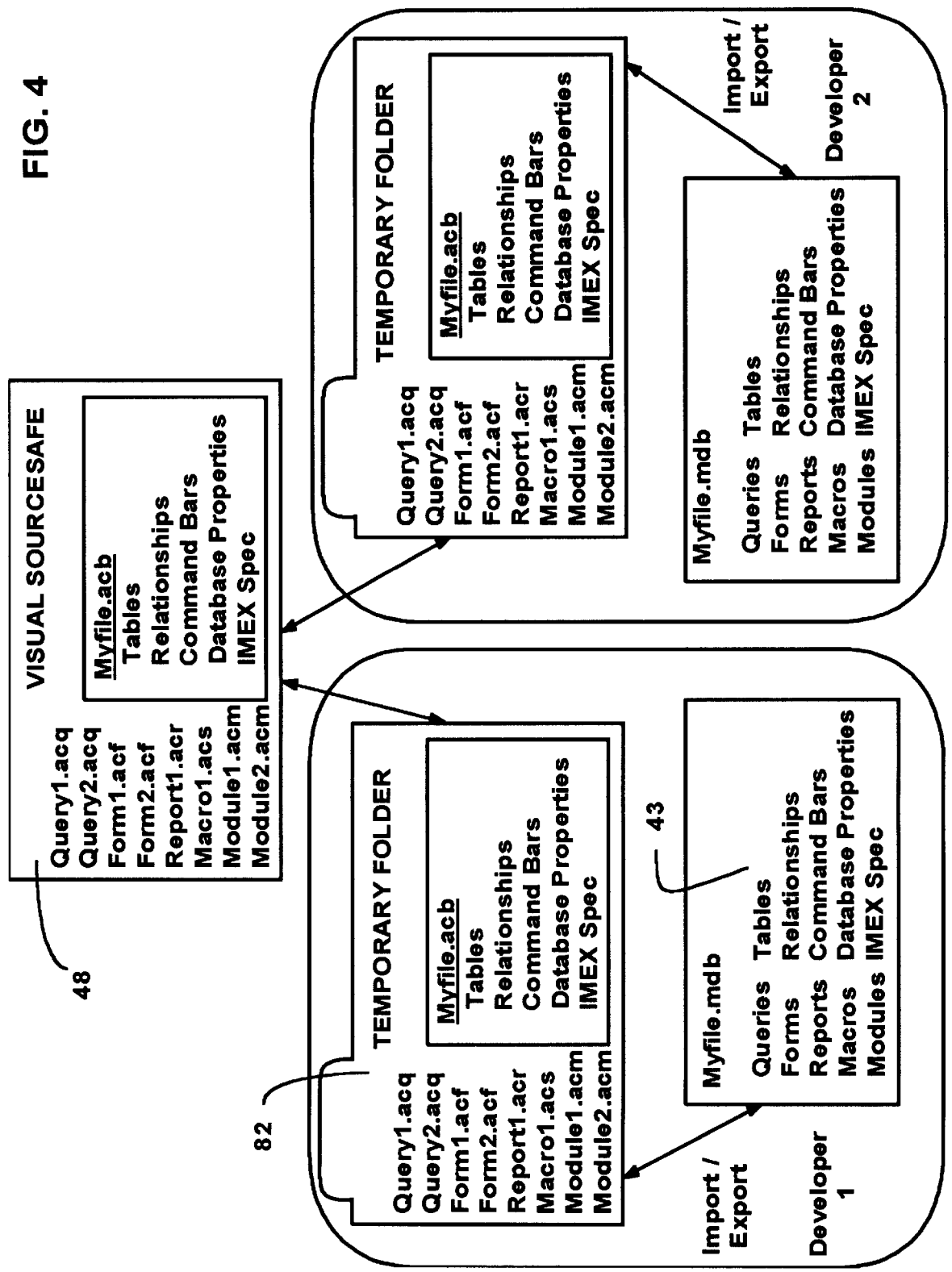
FIG. 4 is a block diagram illustrating how multiple developers connect to the version control system.

As shown in FIG. 4, a developer such as developer 1 can retrieve objects from Visual SourceSafe in one of two ways: "Check Out" means that he intends to edit the objects, "Get" means that he may view or use them but will not make changes. In either case, the appropriate text files 66–73 and/or the binary file 80 are copied from Visual SourceSafe into the temporary folder 82 on the developer's local machine, e.g., machine $20_1$. These files are then loaded from the temporary folder 82 into the user's database 43. If the user checked out an object for editing, he later performs the "Check In" command which has the opposite effect, i.e., first the database object is exported to a file in the temporary folder, and then that file is copied into Visual SourceSafe. After the developer closes the database, the temporary folder 82 and its contents are deleted from the developer's local machine.

The "Check Out" command may be exclusive, meaning that only one user can have a particular object checked out at once. (Note that the "Get" command allows other users, who cannot check out the object, to populate their local databases with all the objects in the project.) If a "Check Out" is non-exclusive, multiple users can edit the same object separately on their hard drives. Any changes are later merged together by Visual SourceSafe into a new object.

In accordance with another aspect of the present invention, there is provided an application programming interface (IAccSccEvents API) and bridge component (AccScc.dll) 90 through which the database application 42 communicates with the version control system 48. Properties in the database application 42 are set when version control is available thereto via this API/component 90. The API/component 90 are separate from the application 42, whereby other application programs including word processors, spreadsheets and other applications can communicate with a version control system 48 therethrough provided they support the interface, or through a similar mechanism. However, because Visual SourceSafe already has a defined API (SccAPI) which provides certain interface functions to a dynamic link library component 92 (SSSCC.dll) for any of several version control systems and programming environments, the bridge component 90 (AccScc.dll) hooks up to the existing dll 92 to facilitate the communication.

The following sets forth and describes the functions in the IAccSccEvents interface of the AccScc dll 90: interface IAccSccEvents: IDispatch
{
[id(1)] HRESULT AfterChangeObjectName([in] long objtyp, [in] BSTR NewObjectName, [in] BSTR OldObjectName);

This function (method) is called by the database (or other) application 42 whenever the name of an object (e.g., a form, report, or macro in Microsoft Access) is changed by a developer. AccScc uses this information to correspondingly change the name of the object in the source code control system.

[id(2)] HRESULT AfterCloseDatabase();

This function is called by the database application 42 to allow AccScc to shutdown the connection to the current source code control project. A related function, AfterOpenDatabase, is described below.

[id(3)] HRESULT AfterNewobject([in] long objtyp, [in] BSTR ObjectName);

This function is called whenever the developer creates a new object and saves it for the first time to the database of the application 42. AfterNewObject thus allows AccScc to ask the developer, via a dialog box, if the new object should be added to the source code control project. Otherwise, the developer might forget to add the new object, and other developers' databases would be broken as soon as the first developer checked in any modules referring to the new module.

[id(4)] HRESULT AfterOpenDatabase([in] BSTR DBName, [in] long fOpenMode);

The AfterOpenDatabase function is called by the database application 42 when a database is opened. If the project has already been added to source code control, AccScc opens the associated source code control project. Otherwise, AccScc via a dialog box in the application program 42 asks if the developer wishes to add the database to source code control. If the developer indicates no, then the database application 42 stores this information and the developer is not asked again.

[id(5)] HRESULT AfterRemoveObject([in] long objtyp, [in] BSTR ObjectName);

The database application 42 calls this function whenever the developer removes an object from the database. In response, AccScc asks if the object should be removed from the source code control project, and if yes, removes it therefrom.

[id(6)] HRESULT BeforeCloseDatabase();

This function is called prior to closing a database, which allows AccScc to ensure that all objects have been saved, and allows AccScc to check in affected objects if the developer so desires.

[id(7)] HRESULT InitializeAccScc ([in] IUnknown* pApplication);

InitializeAccScc is called when AccScc is loaded, and allows it to contact its source code control provider (such as Visual SourceSafe), and initialize it in turn.

Figure 5:
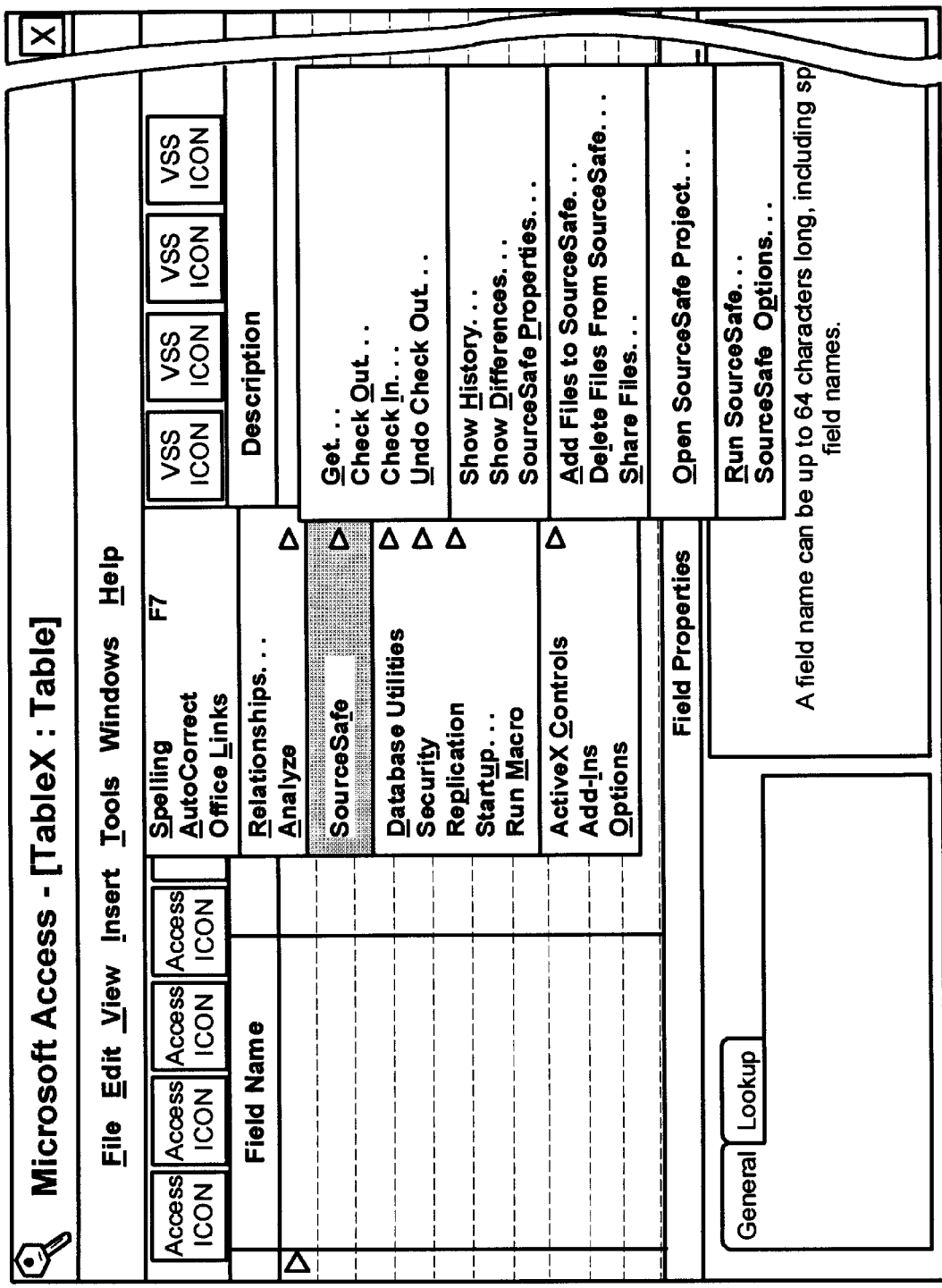
FIG. 5 is a representation of a user-interface for accessing the features of a version control system from within an application program.

[id(8)] HRESULT MenuClicked([in] long tcid);

The database application 42 calls this function whenever the developer chooses a menu item, such as one of the items shown in FIG. 5. In response, AccScc carries out the appropriate command, i.e., Get, Checkout, Checkin, Undo Checkout, Show Differences, and so on.

[id(9)] HRESULT PromptForAdd([in] boolean bPrompt);

The database application 42 uses this function to turn off automatic prompting to add files to source code control, in the event that it wants to add a large number of objects to the database at once. Otherwise, the developer repeatedly receives a prompt such as "Do you want to add this object to source code control?" which, as can be appreciated, quickly becomes tedious. When the database application 42 is finished adding objects, this function is again called with the flag set to true, whereby AccScc asks only once for all files added since the first call.

[id(10)] HRESULT RequestModifyobject([in] long obytyp, [in] BSTR ObjectName, [out] boolean* pbCancel);

Whenever the developer tries to edit an object which is not checked out, the database application 42 calls the RequestModifyObject function. AccScc asks the developer if they would like to check the object out, and if so, checks it out for them, then allows the database application 42 to proceed with its original operation. As a result of this function, the developer need not contemplate whether an object needs to be checked out, but rather works normally to select an object for editing, and is prompted accordingly.

[id(11)] HRESULT RequestRenamePermission ([in] long obytyp, [in] BSTR NewObjectName, [in] BSTR OldObjectName, [out] boolean* pbCancel);

An objects in Visual SourceSafe cannot be renamed if a developer has checked the object out. Whenever a developer tries to rename an object, AccScc uses this function to ensure that the object is not currently checked out before allowing the rename operation to proceed. If the object is checked out, this function sets the boolean *pbCancel to true, and the database application 42 does not allow the rename, prompting accordingly.

[id(12)] HRESULT ShutdownAccScc();

This function allows AccScc to do graceful shutdown processing, (e.g., perform appropriate clean-up operations, file closures and so on) and gracefully shutdown the source code control provider.

[id(13)] HRESULT UpdateMenuItem ([in] IDispatch* pCommandBarItem, [in] long tcid, [out] boolean* pVisible, [out] boolean* pEnabled);
};

This function disables menu items on the user interface 52 (and visually greys them out) when the command is not appropriate for the current state. For example, a check-in command only makes sense if the file is checked out, and thus the check-in command is disabled and greyed-out for this state. Accordingly, whenever the database application 42 displays a menu, it calls this function in AccScc to allow AccScc to disable any appropriate commands.

Figure 6:
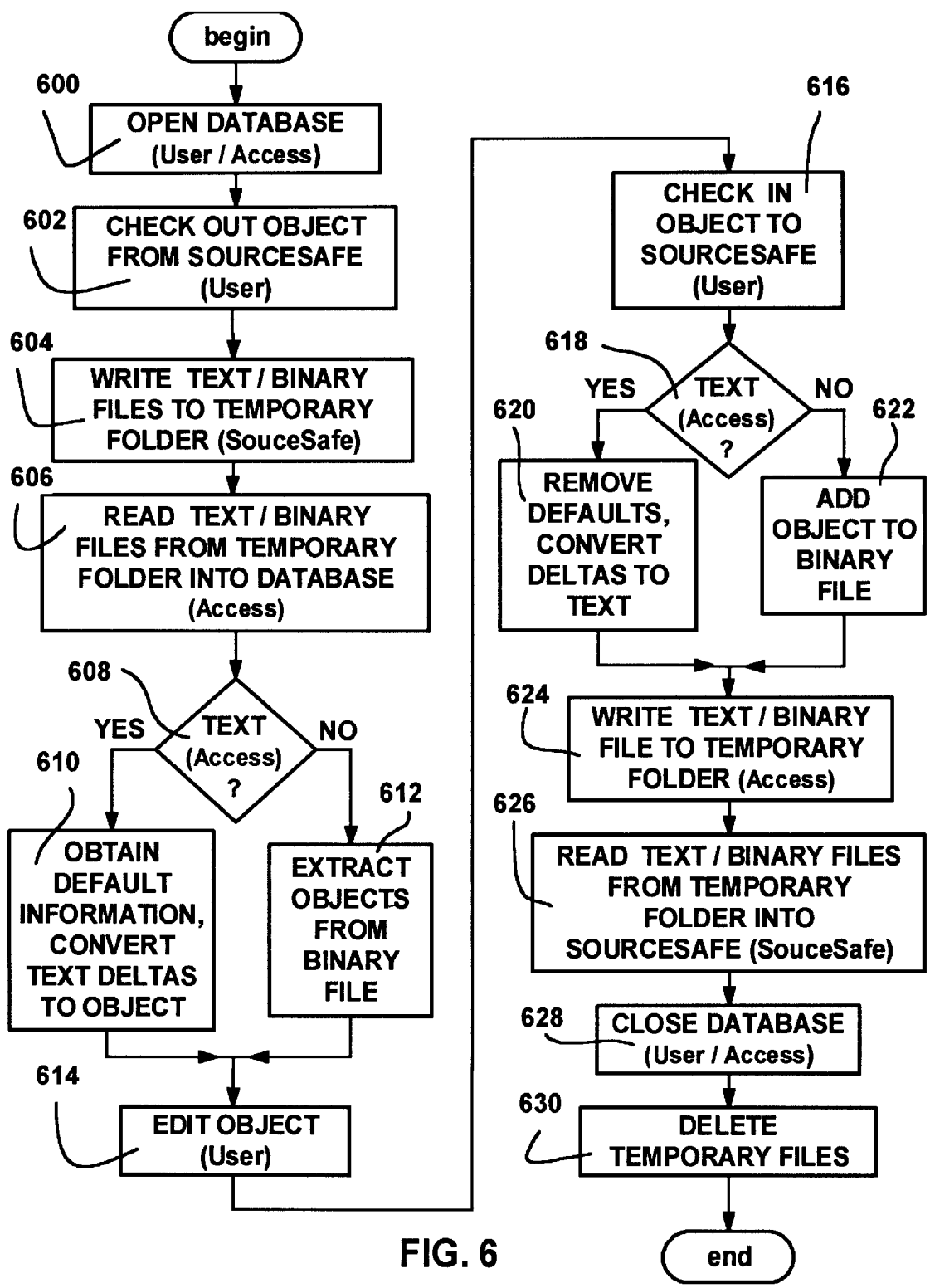
FIG. 6 is a flow diagram representing the general steps taken to integrate an object-based application with a version control system in accordance with one aspect of the present invention.

Turning to an explanation of the operation of the invention with particular respect to the flow diagram of FIG. 6, in the following example a Microsoft Access developer wishes to check out, revise and check in an existing object under control of Visual SourceSafe. Note that in FIG. 6, for clarification purposes in certain instances, the user and/or program that performs a given operation is indicated in parentheses, although it is understood that the invention is not limited to the example described herein.

After opening the database application 42 at step 600 (FIG. 6), as represented in FIG. 5, the developer selects Visual SourceSafe via the Tools drop-down menu on the menu bar of the Access developer interface 94, and selects "Check Out" as represented by step 602. This action includes the bringing up of a dialog box, not shown, by which the developer can choose the object within the project to check out. Note that the object (or objects) can be any one stored under Visual SourceSafe (assuming proper security clearance and so on), including text-represented objects or objects stored in a combined binary form. Further, as set forth above, this operation invokes the MenuClicked function of the AccScc bridge component 90.

In response, at step 604, Visual SourceSafe, via AccScc.dll 90 and SSSCC.dll 92, writes the text deltas and binary file (if a binary file is necessary) into a temporary folder on the developer's local machine, e.g., the machine $20_l$. At step 606, all of the selected objects are read into the database. Note that steps 608–612 indicate the operation of the conversion process 60 to convert the text deltas into the appropriate, complete object, as well as the reading of the binary file (if necessary) and the extraction of the various objects therein into individual objects by the read/write process 68. In any event, at step 614 all objects in the database 43 that the developer has checked out are available to the developer.

At step 614, the developer edits the checked out object accordingly. Note that if the developer attempts to edit an object that is not checked out, the RequestModifyObject function is called as described above to determine if the user can, if desired, check out this other object. Once the developer finishes editing the checked-out object or objects, at step 616 the user chooses check-in via the drop down menu on the graphical user interface 52 (FIG. 5). Note that the MenuClicked function is called in response to the check-in command to notify the bridge component 90 (AccScc) of the check-in operation.

At steps 618–620 and 624, the conversion process 50 operates to write the objects (or object deltas) as text files into the temporary folder 82, as described above. As an optimization, the conversion process need not convert and rewrite text files that have not been changed. Similarly, at steps 622 and 624, the binary read/write process recombines and writes those non-text objects into a combined binary file, if any changes were made thereto. Note that steps 618–624 may be repeated (not shown) as necessary to convert and/or combine and write all objects into the appropriate files.

At step 626, the files are read from the temporary folder 82 into the version control system 48 (Visual SourceSafe). Note that once the files have been written to the temporary folder 82, the bridge component 90 (AccScc) forwards the notification of the check in to the version control system 48. In response, the files in the temporary folder 82 (or at least those which have been changed) are copied into the Visual SourceSafe storage 50 under version control.

Lastly, which may be some time later, at step 628 the developer closes the database 43, whereby (optionally) at step 630 the temporary folder 82 and its contents are deleted from the developer's local machine 20₁.

Commands other than check-out and check-in are handled in a similar manner and are thus not described in detail herein. For example, the "Create Database from SourceSafe Project" is used to create a new Microsoft Access database on the user's hard drive from a Visual SourceSafe project that someone else has already created on the server. In other words, this command is used by a developer to enlist in a multi-developer project that someone else has previously set up. In use, this command causes a dialog box to be displayed by which the developer selects an existing Visual SourceSafe project and a folder in which to place the new Microsoft Access database. The components of the present invention display the dialog, name and create the new database, and then perform a normal "Get" routine to get the files from Visual SourceSafe and import them into the database application 42. The components instruct the database application 42 to open the database. The "Create Database from SourceSafe Project" command adds properties to the database (and to particular objects) as necessary to track the database 43 under source code control.

The "Add Database To SourceSafe" command puts a database 43 under source code control. This command similarly provides a displayed dialog box for selecting the Visual SourceSafe project into which the current database 43 is to be added. As can be appreciated, the command similarly adds properties to the database (and to particular objects) as necessary to track the database 43 under source code control, to track the location of the Visual SourceSafe project for this database 43, and to track versions of particular objects in the database 43.

When adding a database 43, the source code control component further brings up an "Add Objects To SourceSafe" dialog box that lets the user specify which database objects are to be added to source code control. By default, all objects are selected, however certain ones can be omitted. Once selected, the database application 42 prompts the user, temporarily shuts down the database 43 and reopens it exclusively. Then, all the selected queries, forms, reports, macros, and modules are written out as text files to a temporary folder as described above. As also described above, if necessary, the database application 42 creates a binary file in this temporary folder (with the same name as the database and an .acb extension) and exports all the data and miscellaneous objects (e.g., tables, relationships, command bars, import/export specifications, database properties, Visual Basic for Applications project references, the Visual Basic for Applications project name, and conditional compilation arguments) from the database to the binary file. The database application 42 then checks the text files and the binary file into the specified Visual SourceSafe project. When the database 43 is closed, all the temporary objects in the special folder are deleted. As an added feature, the only visible change is that the icons in the database window for tables, queries, forms, reports, macros, and modules have additional symbols to indicate that each object is under source code control, checked out to the user, or checked out to someone else.

As can be appreciated, the user can choose other commands to operate on a file. For example, the "Difference" command is invoked when the user clicks on an object and chooses "Show Differences." Through the components of the present invention, the database application 42 exports the object to a text file (as it does on a Check In), and then Visual SourceSafe displays the differences between its own copy of the file and this local exported copy. Thus, the user sees what changes have been made.

As can be seen from the foregoing detailed description, there is provided a method and system for using a version control system with the individual objects of object-based applications. The method and system function without significant changes to existing version control systems and/or application programs, and provide version control of selected database objects. Moreover, the object information is stored in human-readable text files.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. A method of integrating objects of an object-based application to a version control system, comprising the steps of:

providing an interface for communicating between the application and the version control system;

selecting a plurality of objects of the object-based application as objects for independent version control;

writing information representative of at least part of the data stored in each object selected for independent version control to a separate file; and communicating the separate files to the version control system.

2. The method of claim 1 wherein at least one of the separate files is a text file.

3. The method of claim 2 further comprising the step of recalling each of the separate files from the version control system, and converting the data in each file including the text file into an object corresponding thereto.

4. The method of claim 1 wherein objects of the object-based application are objects selected for combined version control, and further comprising the steps of writing at least two of the objects selected for combined version control to a common file, and communicating the common file to the version control system.

5. The method of claim 4 wherein the common file is a binary file.

6. The method of claim 1 wherein the step of writing information includes the step of exporting the information to a temporary file for each selected object, and wherein the step of communicating the separate files includes the step of copying the temporary files to the version control system.

7. The method of claim 6 further comprising the step of deleting the temporary files.

8. The method of claim 1 wherein the object-based application is a database application, and wherein the step of selecting a plurality of objects includes the step of selecting at least one query of the database application as an object selected for independent version control.

9. The method of claim 1 wherein the object-based application is a database application, and wherein the step of selecting a plurality of objects includes the step of selecting at least one form of the database application as an object selected for independent version control.

10. The method of claim 1 wherein the object-based application is a database application, and wherein the step of selecting a plurality of objects includes the step of selecting at least one report of the database application as an object selected for independent version control.

11. The method of claim 1 wherein the object-based application is a database application, and wherein the step of selecting a plurality of objects includes the step of selecting at least one macro of the database application as an object selected for independent version control.

12. The method of claim 1 wherein the object-based application is a database application, and wherein the step of selecting a plurality of objects includes the step of selecting at least one module of the database application as an object selected for independent version control.

13. The method of claim 1 further comprising the step of comparing actual object data to default object data, and wherein the step of writing information representative of at least part of the data includes writing the data which is different from the default data into the file.

14. The method of claim 1 wherein the step of writing information representative of at least part of the data stored in each object to a separate file includes calculating a checksum for at least one of the files and writing the checksum into the corresponding file.

15. A method of providing version control to a database application on a local machine, comprising the steps of:

selecting a plurality of database objects as objects selected for independent version control thereof;

converting the objects selected for independent version control thereof into text files;

combining other database objects into a binary file;

writing the text files and the binary file to storage of the version control system;

checking out at least one of the files in the project from the version control system via the database application;

copying the checked-out file or files from the storage of the version control system to a temporary folder on the local machine; and converting the text files into database objects and separating the binary file into database objects.

16. A system for connecting a plurality of objects in object-based application to a version control system, comprising:

a storage for storing the objects;

means for writing information representative of at least part of the data stored in each object to a separate file for each object; and an interface responsive to commands from the object-based application and the version control system for transferring the files between the object-based application and the version control system.

17. The system of claim 16 wherein at least one of the separate files is a text file.

18. The system of claim 17 further comprising means for recalling each of the separate files from the version control system, and means for converting the data in each file including the text file into an object corresponding thereto.

19. The system of claim 16 further comprising means for writing at least two other objects to a common file, and means for communicating the common file to the version control system.

20. The system of claim 19 wherein the common file is a binary file.

21. The system of claim 16 wherein the means for writing information includes means for exporting the information to a temporary file for each object, and wherein the means for communicating the separate files includes means for copying the temporary files to the version control system.

22. The system of claim 21 further comprising means for deleting the temporary files.

23. The system of claim 16 wherein the object-based application is a database application, and wherein at least one of the objects is a query of the database application.

24. The system of claim 16 wherein the object-based application is a database application, and wherein at least one of the objects is a form of the database application.

25. The system of claim 16 wherein the object-based application is a database application, and wherein at least one of the objects is a report of the database application.

26. The system of claim 16 wherein the object-based application is a database application, and wherein at least one of the objects is a macro of the database application.

27. The system of claim 16 wherein the object-based application is a database application, and wherein at least one of the objects is a module of the database application.

28. The system of claim 16 further comprising means for comparing actual object data to default object data, and wherein the means for writing information includes means for writing the data which is different from the default data into the file.

29. The system of claim 16 further comprising means for calculating a checksum for at least one of the files, wherein the means for writing information includes means for writing the checksum into the corresponding file or files.

30. The system of claim 16 further comprising a user command input means, wherein the interface passes selected user commands received via the input means to the version control system.

* * * * *